United States Patent [19]
Evans

[11] 3,788,647
[45] Jan. 29, 1974

[54] SWING MEASUREMENT SYSTEM
[75] Inventor: James W. Evans, Jacksonville, Fla.
[73] Assignee: Athletic Swing Measurement, Inc., Clearwater, Fla.
[22] Filed: Dec. 6, 1971
[21] Appl. No.: 205,067

[52] U.S. Cl....... 273/186 A, 273/186 A, 343/6.8 R, 343/6.5 R, 343/720
[51] Int. Cl. ..... A63b 69/36, G01s 9/56, H01q 1/00
[58] Field of Search.... 343/5 R, 720, 6.5 R, 6.5 LC, 343/6.5 SS, 6.8 R, 6.8 LL; 273/186 R, 186 A

[56] References Cited
UNITED STATES PATENTS

| 3,371,345 | 2/1968 | Lewis | 343/6.8 R X |
|---|---|---|---|
| 3,072,899 | 1/1963 | Kleist et al. | 343/6.5 SS |
| 3,579,235 | 5/1971 | Straub et al. | 343/6.5 LC |
| 3,253,588 | 5/1966 | Vuilleumier et al. | 343/6.5 R X |
| 3,270,564 | 9/1966 | Evans | 273/186 A X |
| 2,927,995 | 3/1960 | Francis | 343/720 X |

Primary Examiner—Malcolm F. Hubler
Attorney, Agent, or Firm—Duckworth, Hobby & Allen

[57] ABSTRACT

A swing measurement system for measuring characteristics of the swing of an athlete's arm, bat, club or for orthopedic and medical measurements of the movement of an individual's limbs. A transmitter is utilized for transmitting predetermined frequency to a passive repeater circuit where the received frequency is modulated with signals generated by sensors such as an accelerometer or strain gauge and the modulated frequency retransmitted by the passive repeater to a receiver where it can be displayed for comparison and analysis.

9 Claims, 3 Drawing Figures

SWING MEASUREMENT SYSTEM

BACKGROUND OF THE INVENTION

The present invention is related to U.S. Pat. No. 3,270,564 and to U. S. Pat. No. Application Ser. No. 93,200 filed Nov. 27, 1970 for ATHLETIC SWING MEASUREMENT SYSTEM and reference may be had to this prior patent and application for a better understanding of the present invention.

In athletic games wherein a bat or club is used to strike an object such as a ball or where a ball is thrown, such as a bowling ball, it is axiomatic that the degree of success is largely dependent upon the swing or stroke employed. This is especially the case with sports, such as golf, and much has been written descriptive of what a perfect golf swing should comprise. The difficulty in the past has been that of comparing the actual swing in a given case with a perfect swing. This difficulty in turn arises from the difficulty of observation of a golf swing due to the inability of the eye to catch any precise moment of a golf club during the stroke. This difficulty is well recognized and in efforts to overcome it, a number of techniques and devices have been devised to electrically and mechanically measure relevant parameters. Examples of these are illustrated as follows: the Fox U.S. Pat. No. 1,876,657 described means involving a yieldable club face for indicating the degree of impact with a ball; the Walker U.S. Pat. No. 2,630,012; Lathrop U.S. Pat. No. 3,088,321 and Kirkman U.S. Pat. No. 3,106,403 show various means of indicating golf club velocities; the Chedister U.S. Pat. No. 3,037,777 is directed to means for determining the direction of a stroke; and the Alvarez U.S. Pat. No. 2,852,569, which describes means for assisting a golfer in determining both the direction and velocity of a swing. Recently it is understood that high speed motion picture photography has been employed in an effort to more precisely capture details of golf swings. One recent U.S. Pat. No. by Varju No. 3,182,508 measures the intensity of impact of a golf club and records this by a line connection leading from the golf club to recording equipment and finally the present inventor, in a related patent entitled ATHLETIC SWING MEASUREMENT SYSTEM U.S. Pat. No. 3,270,564, of Sept. 6, 1966, provides a means of measuring the acceleration, torsion and the flex of a bat or club and especially of a golf club and transmitting these signals on three transmitters for display and analyzing the stroke characteristics of an athlete.

The prior art devices and techniques as described in general provided useful means of gathering information of value but it is the experience of the applicant that too often the information as would have been thus obtained is fragmentary and difficult to analyze and not readily translatable into usable form. For example, as a teaching aid, measurements should be accomplished not only without distraction but instantly and when employed to perform the role of analysis for the purpose of choosing a proper club, measurement data must be extensive and must be thoroughly correlated. These are believed shortcomings of the prior art.

It is accordingly one object of the present invention to provide a novel improvement to the previous patent by the present inventor for measuring athletic swings in general and which is substantially more complete than previously employed and which provides means without distraction of obtaining quickly, precisely and conveniently data that may be readily analyzed to correct defects in one's swing and also provide a relatively complete basis for the selection of proper athletic equipment such as a golf club or bowling ball. In accordance with the present invention means are provided for making one or more of several measurements which have beeen found significant in analyzing an athlete's stroke characteristics. These measurements which are electrically obtained are then transmitted by radio to a remote console which includes means for registering them continuously throughout a stroke and correlating them directly with time. Thus, the system provides a complete analysis of the particular measurements made at each instance of significance throughout the stroke. Means are also provided for displaying this data for immediate examination or subsequent analysis. These measurements include velocity or acceleration, either twist or torsion, and flex or bending of a handle of a bat or club or of a plate attached to the athlete's arm or leg throughout the stroke.

It is another object of the present invention to provide a swing measurement system utilizing a passive repeater circuit in the club or bat for receiving a transmitted signal, modulating that signal when retransmitting it to a receiver for reducing the power and circuitry required in the club or bat or on an individual's arm or leg in a measurement system as described and thus requiring less frequency change of battery or recharging.

SUMMARY OF THE INVENTION

The present invention relates to an athletic or medical swing measurement system using one or more accelerometers for measuring velocity or acceleration and one or more strain gauges for measuring flex or bending and twist or torsion in an athletic club or bat or any plate attached to an athlete's arm or leg. The accelerometer and strain gauges produce electrical signals analagous to the measurements made which signals modulate a signal being received in a passive repeater circuit prior to said modulator frequency being retransmitted. A transmitter transmits a predetermined frequency which is received by the passive repeater circuit and is modulated by sensors such as accelerometers and strain gauges, which sensing circuits are coupled to the passive repeater and generate electrical signals analagous to conditions being sensed in the bat or club or in the athlete's arm or leg and are used to modulate the passive repeater, the frequency being received for retransmission to a receiver and display. The circuit also provides two multiplex signals from the sensors and utilizes a single multiplex signal driving a single mixing oscillator for modulating the frequency being received by the passive repeater and transmitting the single signal to a single receiver where it is demultiplexed and displayed. In the case of golf clubs, and the like, the club itself may be used as a coaxial antenna tuned to the proper frequency for the passive repeater circuit.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

The present invention relates to an improvement in an athletic or medical swing measurement system claimed and more fully set forth in U. S. Pat. No. 3,270,564, and U. S. Pat. Application Ser. No. 93,200. In those systems, the individual's swing was measured utilizing one or more accelerometers for measuring velocity or acceleration and with strain gauges for measuring velocity or acceleration and with strain gauges for measuring flex or bending and twist or torsion in an athletic club or bat or in a plate attached to an athlete's arm or leg. Accelerometer and strain gauges produced electrical signals analagous to the measurements made, which signals were transmitted over the air in a single multiplex channel to a receiver adapted to separate the signals and which had an analog to digital converter system for converting the received signals to digitized data indicative of the output of the accelerometer and strain gauges. The data was then displayed on a cathode ray tube, oscillograph display or recorded for later comparative analysis. In one embodiment a plate was used having strain gauges attached to it which was easily adaptable for strapping to the wrist or leg of the athlete so that the flex and twist in the plate would follow the twist and flex in the bone of the athlete's limb allowing measurements to be taken by the strain gauges. The velocity or acceleration was measured with an accelerometer attached to the same plate. Measurements could also be taken by pairs of accelerometers placed at different points and then computing the differences between the velocity and acceleration of the two gauges.

Figure 1:
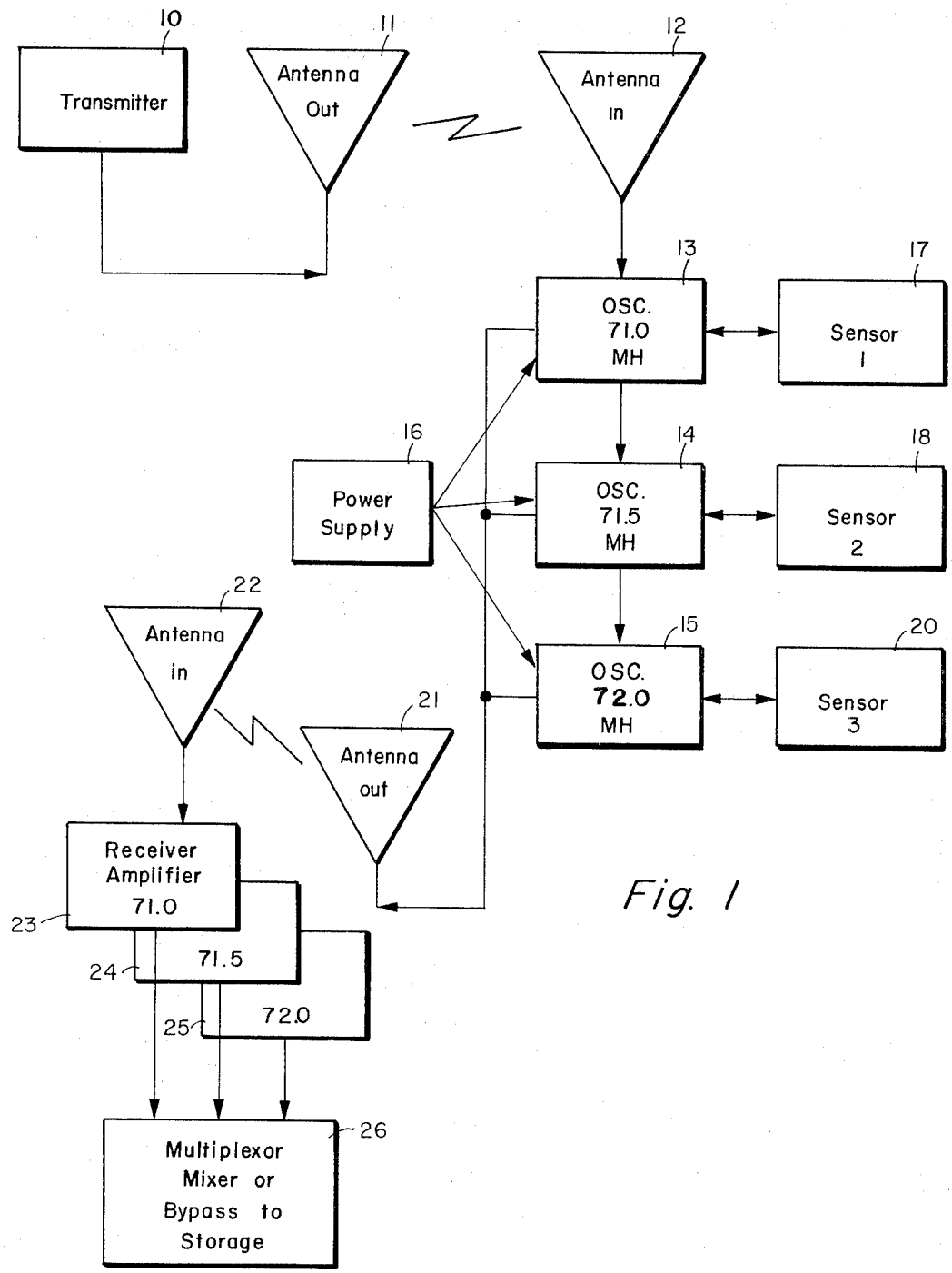
FIG. 1 is a block diagram of a preferred embodiment of the present invention.

Referring now to FIG. 1 of the drawings, there can be seen a transmitter 10 connected to an antenna 11 for generating and transmitting a predetermined frequency which may be received by the antenna 12 of the passive repeater circuit. The passive repeater circuit has three voltage control oscillators 13, 14 and 15, and a power supply 16. Oscillator 13 is controlled by a sensor 17 while oscillator 14 is controlled by a second sensor 18 and oscillator 15 by a third sensor 20. Sensors 17, 18 and 20 can be accelerometers or strain gauges as previously described and measure acceleration or velocity, and twist or torsion along with flex, and generally electrical signals analagous to these measurements which are applied to the oscillators 13, 14 and 15 for modulating the radio frequency being received by the antenna 12. Passive repeater retransmits the received frequency at the antenna 21 which frequency has now been modulated at the oscillators 13, 14 and 15. It should be noted at this point that the transmitted energy from transmitter 10 could be used to generate the power to activate the oscillators 13, 14 and 15, and thereby do away with the battery in the club without departing from the spirit and scope of the invention. The transmitted signal from the antenna 21 may be picked up by an antenna 22 connected to three receivers 23, 24 and 25, which receivers amplify the signal and apply it to a multiplexor mixer or bypass to storage circuit 26 which either stores the data or passes it to the display units. While not intended to be limited to any particular frequency, one tested frequency has utilized 71 MH for oscillator 13, 71.5 MH for oscillator 14, and 72 MH for oscillator 15, with receivers 23, 24 and 25 respectively matching oscillators 13, 14 and 15. The transmitters circuit 10 can be mounted in a receiver display housing which includes the receivers 23, 24 and 25 and display circuitry all together with the passive repeater and sensor circuits being mounted in a golf club, baseball bat, or on an individual's arm or leg.

Figure 2:
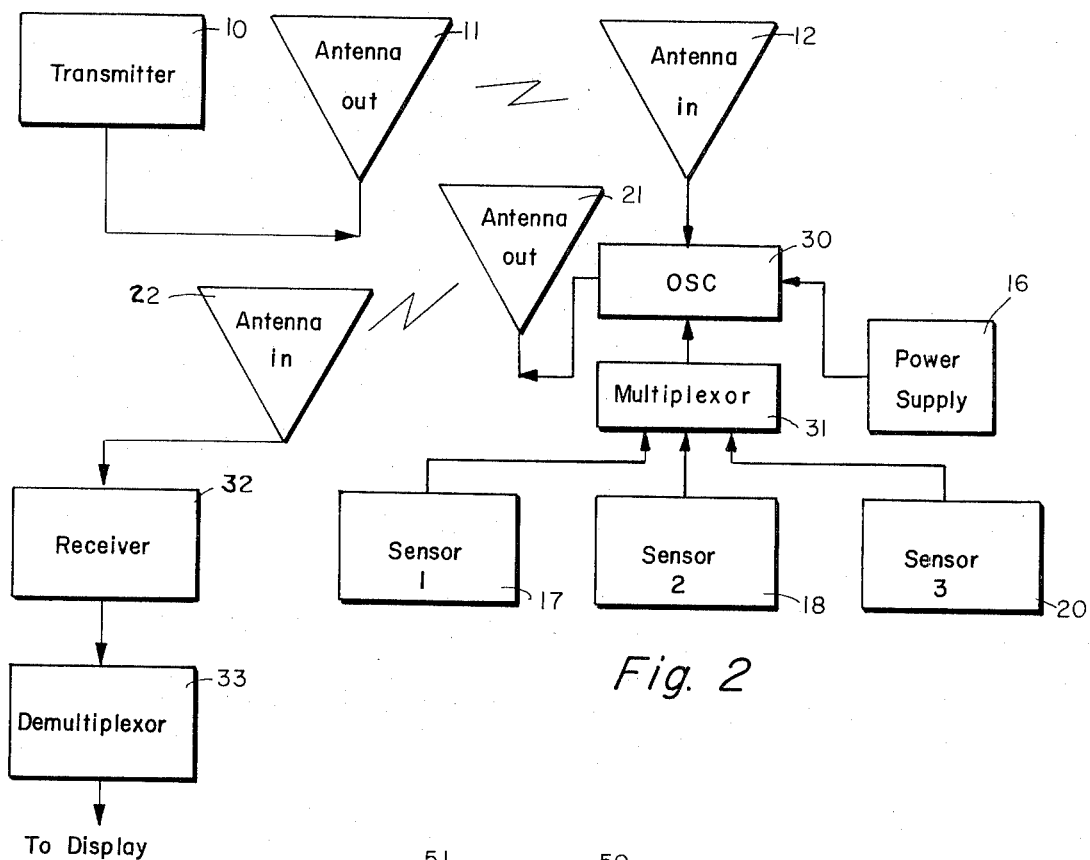
FIG. 2 is a block diagram of a second preferred embodiment of the pressnt invention.

Referring now to FIG. 2, a second embodiment is illustrated of the system of FIG. 1 and having a transmitter 10 with antenna 11 transmitting to a receiving antenna 12. However, the passive repeater of the present circuit has only one oscillator 30 connected to the antenna 21 and having the power supply 16 connected thereto. Three sensors 17, 18 and 20 are also used but are fed to a multiplexer 31 which multiplexes the three signals for modulating a single oscillator 30 for the transmittion of all of the sensed measurements over a single frequency to the antenna 22 and then feeds a single receiver 32. This circuit also requires a demultiplexing circuit 33 for demultiplexing the signal being received and for sending to the display or storage units.

Figure 3:
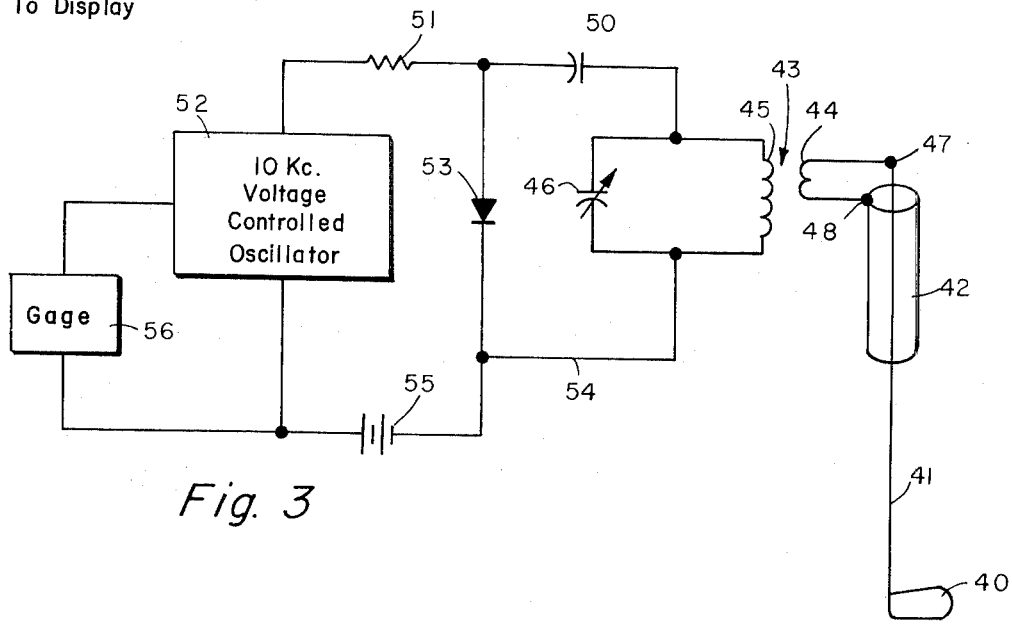
FIG. 3 is a schematic of the passive repeater circuit used in the invention of FIGS. 1 and 2.

FIG. 3 more clearly illustrates the operation of the passive repeater of FIGS. 1 and 2. It is illustrated in connection with a golf club having a head 40 with the club portion 41 being used as part of the antenna. A strip of aluminum 42 can be placed around the golf club insulated from the club 41 with any insulating materials such as insulating tape, thus creating a coaxial antenna between the inner portion 41 and the outer portion 42 of the golf club handle. The rest of the circuit will of course be located in the handle too, but is illustrated in schematic form having a transformer 43 with a primary winding 44 and secondary winding 45, with secondary winding 45 being connected in parallel with a variable or trimmer capacitor 46. The primary winding 44 is connected to the coaxial antenna at 47 and 48 while the secondary winding has one side connected through a capacitor 50 and resistor 51 to an integrated voltage controlled oscillator 52 which is also connected to the opposite side of the secondary winding 45. Oscillator 52 could of course be a crystal controlled oscillator without departing from the spirit and scope of the invention. A diode 53 has its anode connected between capacitor 50 and resistance 51 and its cathode connected to the opposite line 54, connecting the opposite side of the secondary winding 45 to the voltage controlled oscillator 52. A power source 55 is illustrated connected to the voltage controlled oscillator and to the gauge or sensor 56. This particular embodiment was utilized with a 72 MH transmitter and an FM receiver modified for 144 HM use with a golf club coaxial antenna tuned to 144 MH. A 72 MH tank circuit having winding 45 and capacitor 46 was coupled to the club for receiving the radiated energy from a transmitter. The detector diode 53 was connected in parallel with the tank circuit and caused the generation of the 144 MH energy which was transmitted by the club since this is its natural frequency. Modulation is accomplished by varying the bias current through the diode 53 and is set up using the following values:

Detector diode 53-IN91 or equivalent.
Capacitor 50, 33 microfarads
Capacitor 46, 3 of 15 microfarads
Trimmer Capacitor
Coil 45, 6 turns No. 12 wire 3/8 inch diameter Coil 44, 4 turns No. 12 ⅜ inch diameter
Voltage controlled oscillator 52, 10 KC
Battery 55, 4 volts
Aluminum wrapping 42, 18 inches long
Resistor 51, 470 K. ohms It should be clear at this point that a system has been provided for measuring the swing of an athlete or any individual and it may be used in a great variety of sports, but it also may be used by physical therapists, orthopedic doctors, and the like, for measuring and training in the medical fields. It will of course be clear that further embodiments are anticipated as being within the spirit and scope of the invention and that the present device is an improvement over previous inventions, for simplifying and improving the reliability of the swing measurement system.

Accordingly, this invention is not to be construed as limited to the particular forms disclosed herein since these are to be regarded as illustrative rather than restrictive.

I claim:
1. A measuring system comprising in combination:
    a. transmitting means for transmitting a predetermined frequency;
    b. an athletic swing member;
    c. passive repeater means attached to said athletic swing member for receiving said transmitted frequency and retransmission thereof;
    d. a plurality of sensors attached to said athletic swing member and coupled to said passive repeater means for generating electrical signals analagous to conditions of said athletic swing member, said sensors being adapted to modulate said passive repeater means frequency being received from said transmitter means prior to retransmission thereof;
    e. receiver means for receiving modulated frequency being retransmitted from said passive receiver and converting and displaying said data whereby predetermined conditions of an athletic swing can be measured; and
    f. an antenna utilizing said athletic swing member having a center metallic member surrounded by a second metallic member for creating a coaxial antenna.

2. The measuring system in accordance with claim 1 in which said passive repeater means includes a single oscillator circuit and said plurality of sensors are connected to a multiplexor circuit which is in turn coupled to said oscillator circuit for transmitting a plurality of sensed measurements over a single frequency.

3. The apparatus in accordance with claim 1 in which said passive repeater circuit includes three oscillators coupled to three sensors for transmitting said measured data over slightly different frequencies back to the receiver.

4. The apparatus in accordance with claim 3 in which each said oscillator is a crystal controlled oscillator.

5. The apparatus in accordance with claim 3 in which said receiver means includes three receivers for receiving the data from three separate sensors.

6. The apparatus in accordance with claim 1 in which said sensors include at least one accelerometer and one strain gauge.

7. The apparatus in accordance with claim 1, in which the center metallic member is a golf club handle having insulation wrapped therearound and then surrounded with an aluminum covering.

8. The apparatus in accordance with claim 1 including a remotely located display unit having a transmitting means and receiving means therein, along with a display means for displaying the data received on a display panel.

9. The apparatus in accordance with claim 8 in which the display panel is a cathode ray tube.

\* \* \* \* \*